US010824204B2

(12) United States Patent
Lin et al.

(10) Patent No.: US 10,824,204 B2
(45) Date of Patent: Nov. 3, 2020

(54) HINGE MODULE AND FOLDABLE ELECTRONIC DEVICE

(71) Applicants:Che-Hsien Lin, Taipei (TW);
Che-Hsien Chu, Taipei (TW);
Chun-An Shen, Taipei (TW)

(72) Inventors: Che-Hsien Lin, Taipei (TW);
Che-Hsien Chu, Taipei (TW);
Chun-An Shen, Taipei (TW)

(73) Assignee: COMPAL ELECTRONIC, INC.,
Taipei (TW)

( * ) Notice: Subject to any disclaimer, the term of this patent is extended or adjusted under 35 U.S.C. 154(b) by 0 days.

(21) Appl. No.: 16/275,265

(22) Filed: Feb. 13, 2019

(65) Prior Publication Data

US 2019/0250676 A1     Aug. 15, 2019

Related U.S. Application Data

(60) Provisional application No. 62/630,249, filed on Feb. 14, 2018.

(51) Int. Cl.
*E05D 3/06*     (2006.01)
*G06F 1/16*     (2006.01)
*E05D 11/08*     (2006.01)

(52) U.S. Cl.
CPC .......... *G06F 1/1681* (2013.01); *E05D 11/082* (2013.01); *G06F 1/1616* (2013.01); *E05Y 2900/606* (2013.01)

(58) Field of Classification Search
CPC .............. Y10T 16/5387; Y10T 16/547; Y10T 16/54038; E05D 3/12; E05D 3/06;
(Continued)

(56) References Cited

U.S. PATENT DOCUMENTS 8,944,715 B2 *   2/2015   Yoder ................... B43K 5/005
                                                   401/131
8,959,720 B2 *   2/2015   Hsu ....................... G06F 1/1681
                                                   16/303
(Continued)

FOREIGN PATENT DOCUMENTS

CN        203670442        6/2014
CN        104421325        3/2015
(Continued)

OTHER PUBLICATIONS

"Office Action of China Counterpart Application", dated Jan. 2, 2020, p. 1-p. 12.
(Continued)

*Primary Examiner* — Chuck Y Mah
(74) *Attorney, Agent, or Firm* — JCIPRNET

(57) ABSTRACT

A hinge module including a first rotating shaft, a second rotating shaft, a sliding member, a first torque member, and a second torque member is provided. The sliding member coupled to the first rotating shaft and the second rotating shaft simultaneously. The first rotating shaft and the second rotating shaft are rotated synchronously via the sliding member. The first torque member and the second torque member are connected to the first rotating shaft and the second rotating shaft, and the first torque member and the second torque member are located at opposite sides of a sliding range of the sliding member. A foldable electronic device is also provided.

16 Claims, 14 Drawing Sheets

(58) Field of Classification Search
CPC .......... E05D 3/10; E05D 3/18; E05D 11/082; E05D 2005/106; G06F 1/1681; G06F 1/1616; G06F 1/1618; E05Y 2900/606; H04M 1/0216; H04M 1/0222; H04M 1/022; H05K 5/0226
See application file for complete search history.

(56) References Cited

U.S. PATENT DOCUMENTS

| | | | | |
|---|---|---|---|---|
| 9,265,167 | B2* | 2/2016 | Hsu | G06F 1/1679 |
| 9,274,566 | B1* | 3/2016 | Horng | G06F 1/1681 |
| 9,534,432 | B2* | 1/2017 | Lee | G06F 1/1681 |
| 10,590,685 | B2* | 3/2020 | Hsu | G06F 1/1652 |
| 2015/0160695 | A1* | 6/2015 | Su | G06F 1/1618 |
| | | | | 16/366 |
| 2015/0173218 | A1* | 6/2015 | Hsu | E05D 3/12 |
| | | | | 16/366 |
| 2015/0189777 | A1* | 7/2015 | Hsu | H05K 5/0226 |
| | | | | 16/366 |
| 2015/0245510 | A1* | 8/2015 | Hsu | H05K 5/0226 |
| | | | | 16/250 |
| 2015/0309539 | A1* | 10/2015 | Kamphuis | G06F 1/1681 |
| | | | | 361/679.27 |
| 2015/0309541 | A1* | 10/2015 | Horng | G06F 1/1681 |
| | | | | 16/250 |
| 2018/0329462 | A1* | 11/2018 | Larsen | G06F 1/1681 |

FOREIGN PATENT DOCUMENTS

| | | |
|---|---|---|
| CN | 206352618 | 7/2017 |
| TW | M478992 | 5/2014 |
| TW | M497415 | 3/2015 |
| TW | I629584 | 7/2018 |

OTHER PUBLICATIONS

"Office Action of Taiwan Counterpart Application", dated Apr. 27, 2020, p. 1-p. 6.

* cited by examiner

HINGE MODULE AND FOLDABLE ELECTRONIC DEVICE

CROSS-REFERENCE TO RELATED APPLICATION

This application claims the priority benefit of U.S. provisional application Ser. No. 62/630,249, filed on Feb. 14, 2018. The entirety of the above-mentioned patent application is hereby incorporated by reference herein and made a part of this specification.

BACKGROUND

Technical Field

The invention relates to hinge module and a foldable electronic device applying the same.

Description of Related Art

Notebook computers are developed with an aim to replace the desktop computers in order to allow the users to carry the computers more conveniently. A notebook computer includes a first body having a display screen, a second body having an operating system, and a hinge structure configured to connect the first body to the second body, and in order to allow the first body and the second body to be unfolded in a relatively large angle, a dual-shaft hinge structure may be adopted.

In order to satisfy the trend of light and thin design, the appearance of related members of the notebook computer is required to be reduced; nevertheless, the appearance of the hinge module used to support the bodies cannot be accordingly reduced so as to maintain torque of a certain level. That is to say, when the hinge module is reduced along with the bodies, the torque generated by the hinge module may be too low to support the bodies, and such situation is an obstacle to the light and thin design of the notebook computers.

SUMMARY

The invention provides a hinge module and a foldable electronic device in which a sliding member is coupled to dual shafts to achieve synchronous rotation and torque members are distributed at two opposite sides of the sliding member to achieve stress dispersion.

A hinge module provided by an embodiment of the invention includes a first rotating shaft, a second rotating shaft, a sliding member, a first torque member, and a second torque member. The sliding member is coupled to the first rotating shaft and the second rotating shaft simultaneously. When the first rotating shaft is rotated, the first rotating shaft synchronously rotates the second rotating shaft via the sliding member, or when the second rotating shaft is rotated, the second rotating shaft synchronously rotates the first rotating shaft via the sliding member. The first torque member and the second torque member are respectively connected to the first rotating shaft and the second rotating shaft. The first torque member and the second torque member are located at opposite sides of a sliding range of the sliding member along the first rotating shaft and the second rotating shaft.

A foldable electronic device provided by an embodiment of the invention includes a first body, a second body, and at least one hinge module. The hinge module connects the first body and the second body, so that the first body and the second body are rotated and unfolded/folded with respect to each other via the hinge module. The hinge module includes a first rotating shaft, a second rotating shaft, a sliding member, a first torque member, and a second torque member. The sliding member is coupled to the first rotating shaft and the second rotating shaft simultaneously. When the first rotating shaft is rotated, the first rotating shaft synchronously rotates the second rotating shaft via the sliding member, or when the second rotating shaft is rotated, the second rotating shaft synchronously rotates the first rotating shaft via the sliding member. The first torque member and the second torque member are respectively connected to the first rotating shaft and the second rotating shaft. The first torque member and the second torque member are located at opposite sides of a sliding range of the sliding member along the first rotating shaft and the second rotating shaft.

A foldable electronic device provided by an embodiment of the invention includes a first body, a second body, and at least one hinge module. The hinge module connects the first body and the second body, so that the first body and the second body are rotated and unfolded/folded with respect to each other via the hinge module. The hinge module includes a first rotating shaft, a second rotating shaft, a sliding member, and at least one torque member. The sliding member is slidably coupled to the first rotating shaft and the second rotating shaft simultaneously, and a sliding axial direction of the sliding member is identical to a rotating axial direction of the first rotating shaft and a rotating axial direction of the second rotating shaft. When the first rotating shaft is rotated, the first rotating shaft synchronously rotates the second rotating shaft via the sliding member, or when the second rotating shaft is rotated, the second rotating shaft synchronously rotates the first rotating shaft via the sliding member. The torque member is connected to the first rotating shaft and the second rotating shaft, and the torque member is disposed adjacent to one side of the sliding member.

To sum up, the sliding member of the hinge module is coupled to the first rotating shaft and the second rotating shaft simultaneously, and the first rotating shaft and the second rotating shaft are able to generate a synchronous rotation via the sliding member, and thereby, efficiency of rotating and unfolding/folding of the foldable electronic device is increased. Further, the first torque member and the second torque member of the hinge module are disposed at the two opposite sides of a driving mechanism formed among the sliding member, the first rotating shaft, and the second rotating shaft, and thus, when the hinge module is rotated, the first torque member and the second torque member individually provide torque to the rotating shafts, and that is to say, the single rotating shaft does not have to bear excessively concentrated stress because of the stress dispersion the separation of the torque members. In this way, as the first rotating shaft and the second rotating shaft do not have to bear greater stress, the appearance thereof may thus be reduced by a designer, so that the hinge module and the foldable electronic device applying the same may feature the light and thin appearance.

To make the aforementioned more comprehensible, several embodiments accompanied with drawings are described in detail as follows.

DESCRIPTION OF THE EMBODIMENTS

Figure 1:
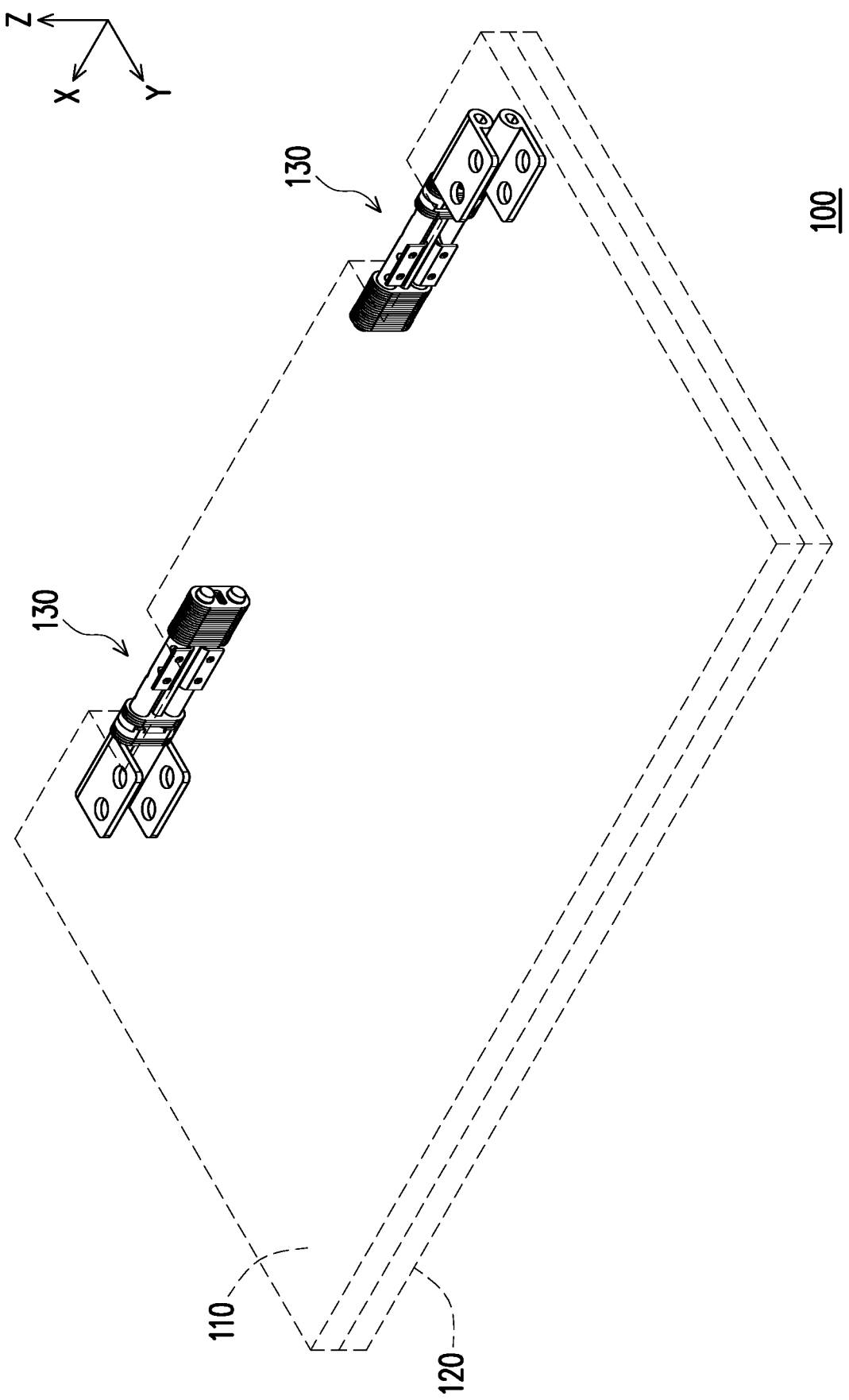
FIG. 1 is a schematic view of a foldable electronic device according to an embodiment of the invention.
Figure 2A:
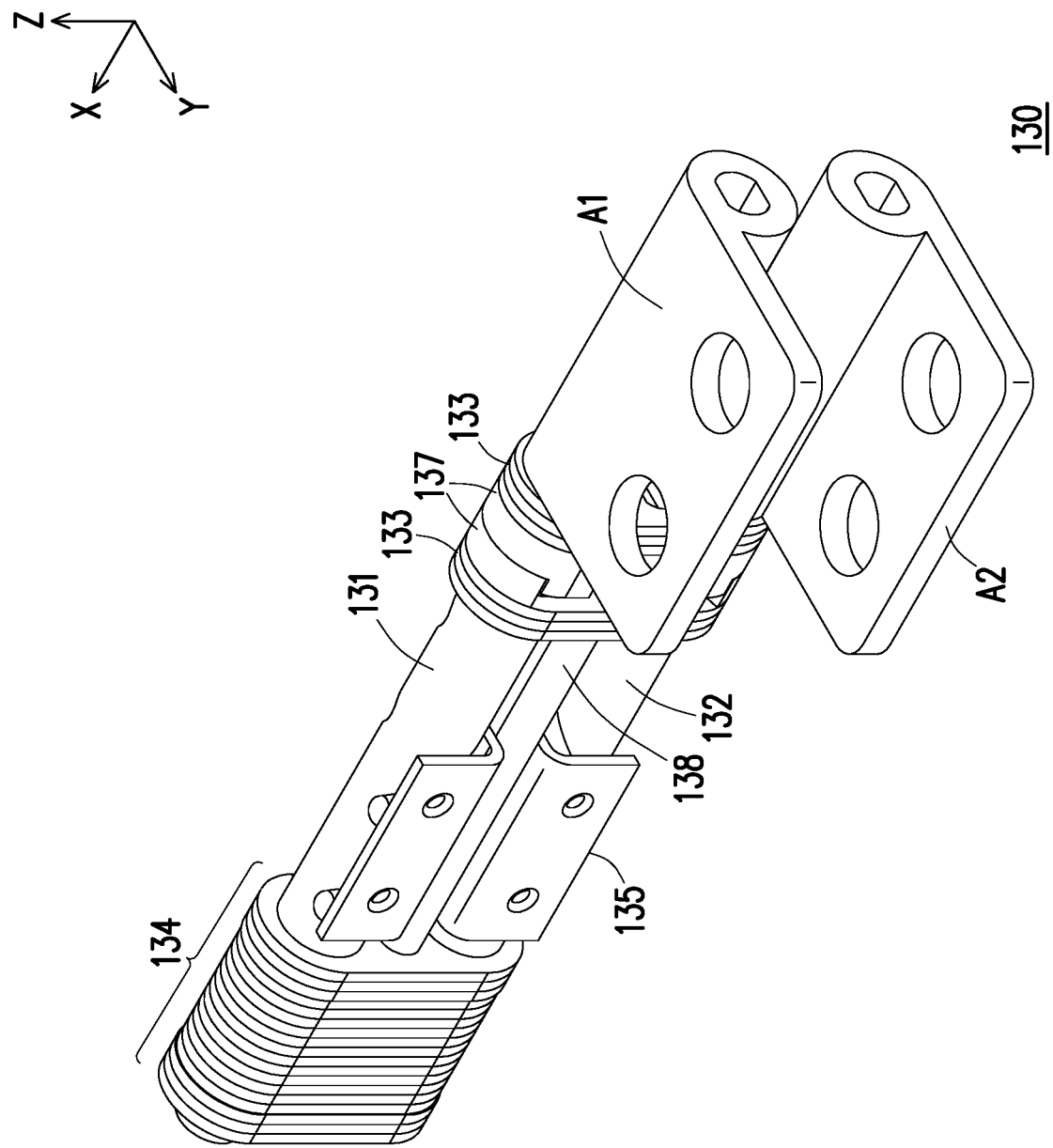
FIG. 2A is a schematic view of a hinge module of FIG. 1.

FIG. 1 is a schematic view of a foldable electronic device according to an embodiment of the invention. FIG. 2A is a schematic view of a hinge module of FIG. 1. A Cartesian coordinate system X-Y-Z is also provided for ease of description of members. With reference to FIG. 1 and FIG. 2A together, in this embodiment, a foldable electronic device 100 is, for example, a notebook computer, and includes a first body 110 (e.g., a screen), a second body 120 (e.g., a system host), and a plurality of hinge modules 130, and the hinge modules 130 connect the first body 110 and the second body 120, are disposed at a same side of the first body 110 and the second body 120, and are independent from one another. The first body 110 and the second body 120 are rotated to be unfolded or folded about the X-axis with respect to each other through the hinge modules 130.

Figure 2B:
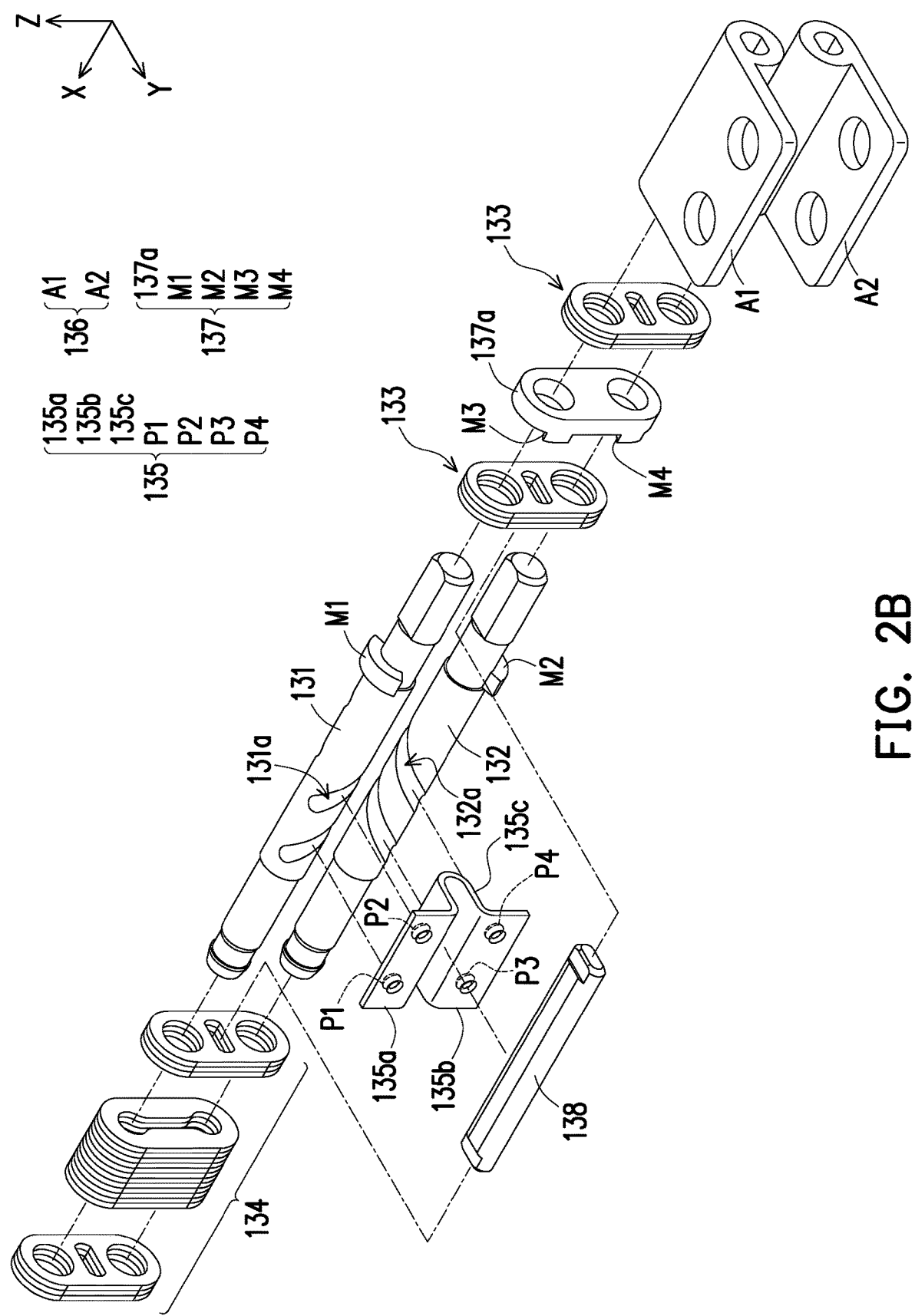
FIG. 2B is an exploded view of the hinge module of FIG. 2A.
Figure 2C:
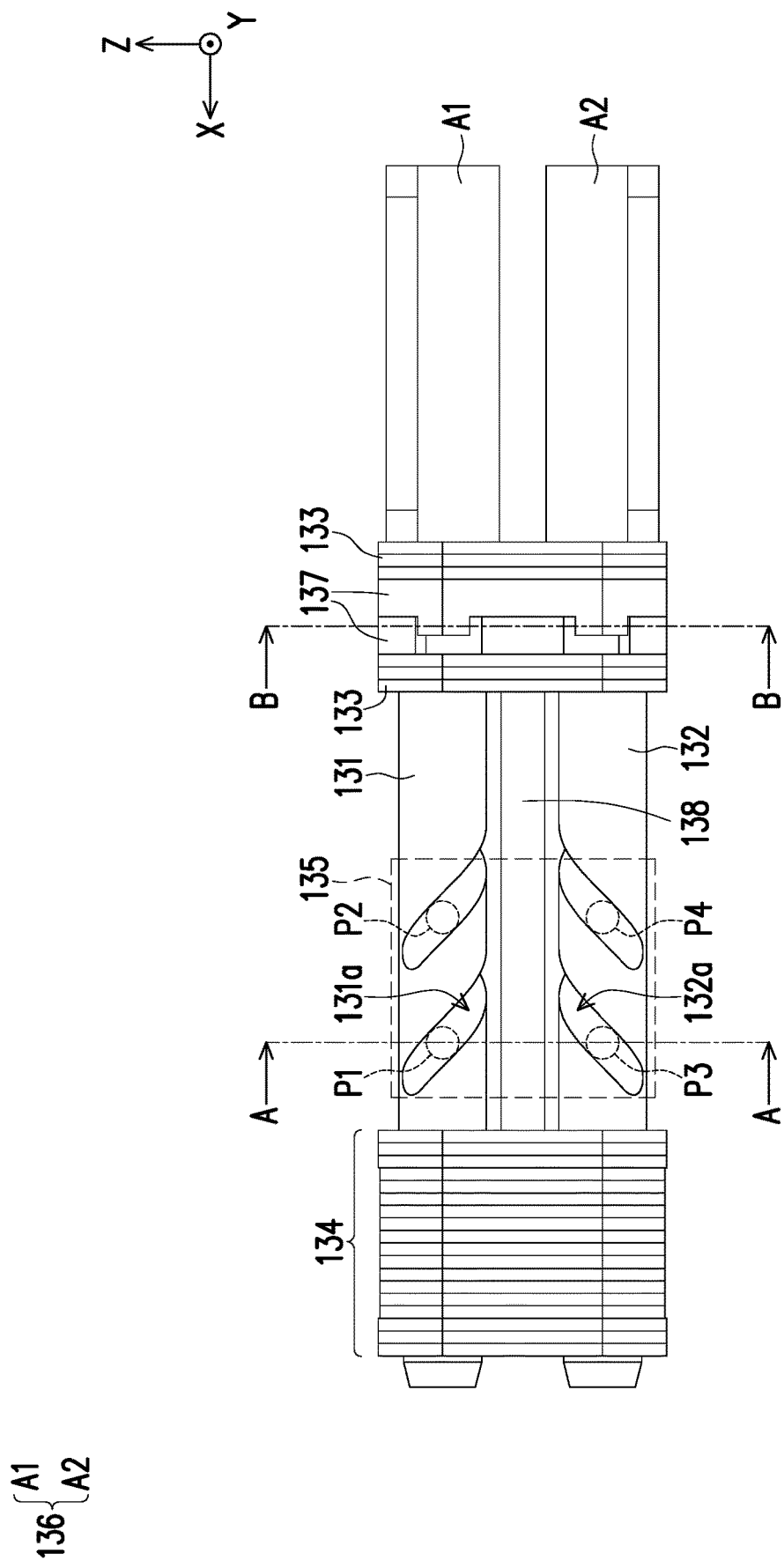
FIG. 2C is a front view of the hinge module of FIG. 2A.

FIG. 2B is an exploded view of the hinge module of FIG. 2A. FIG. 2C is a front view of the hinge module of FIG. 2A. With reference to FIG. 2A to FIG. 2C together, each of the hinge modules 130 includes a first rotating shaft 131, a second rotating shaft 132, a sliding member 135, a bracket 136, a first torque member 134, and a second torque member 133. The bracket 136 includes members A1 and A2, and the member A1 is assembled to the first body 110, and the member A2 is assembled to the second body 120. When a user applies an external force to the foldable electronic device 100, the first body 110 and the second body 120 may be rotated and unfolded or folded owing to the hinge module 130.

Further, the sliding member 135 is slidably coupled to the first rotating shaft 131 and the second rotating shaft 132 simultaneously, and a sliding axial direction (the X-axis) of the sliding member 135 is identical to a rotating axial direction (the X-axis) of the first rotating shaft 131 and a rotating axial direction (the X-axis) of the second rotating shaft 132. When the first rotating shaft 131 is rotated, the first rotating shaft 131 synchronously rotates the second rotating shaft 132 via the sliding member 135, or when the second rotating shaft 132 is rotated, the second rotating shaft 132 synchronously rotates the first rotating shaft 131 via the sliding member 135.

As shown in FIG. 2B, specifically, the first rotating shaft 131 and the second rotating shaft 132 respectively have a spiral groove 131a and a spiral groove 132a, and the sliding member 135 has a plurality of protrusions P1 and P2 correspondingly coupled to the spiral groove 131a and protrusions P3 and P4 correspondingly coupled to the spiral groove 132a. Accordingly, as the sliding member 135 is coupled to the first rotating shaft 131 and the second rotating shaft 132 simultaneously and thus a mechanical linking relation is presented that when the first rotating shaft 131 is rotated, that is, when the protrusions P1 and P2 move along the spiral groove 131a to drive the sliding member 135, the sliding member 135 moves along the X-axis, and it also means that the protrusions P3 and P4 move along the spiral groove 132a as well, and in this way, the second rotating shaft 132 is driven to rotate about the X-axis, so that the first rotating shaft 131 and the second rotating shaft 132 are rotated about the X-axis relatively via the sliding member 135 being slid in the X-axis. Herein, the spiral grooves 131a and 132a are substantially disposed around the rotating axial directions of the first rotating shaft 131 and the second rotating shaft 132. In other words, when the user unfolds the first body 110 and the second body 120 as described above, since the sliding member 135, the first rotating shaft 131, and the second rotating shaft 132 of the hinge module 130 are linked up, the user simultaneously unfolds the second body 120 when applying a force to the first body 110 and a synchronous movement is thus achieved.

In addition, the hinge module 130 is connected to the first rotating shaft 131 and the second rotating shaft 132 respectively through the first torque member 134 and the second torque member 133, and the first torque member 134 and the second torque member 133 are located at two opposite sides of a sliding range of the sliding member 135 along the first rotating shaft 131 and the second rotating shaft 132, so that torque dispersion is achieved in the hinge module 130. That is, in the existing art, when the bodies are unfolded/folded in a concentrated torque structure, the first rotating shaft 131 and the second rotating shaft 132 have to face stress concentration, and as such, in terms of structural rigidity, an appearance of the first rotating shaft 131 and the second rotating shaft 132 are required to be maintained so as to bear stress concentration as described above. Nevertheless, in this embodiment, as the first torque member 134 and the second torque member 133 are separately disposed at two opposite sides of the linking mechanism (a linking region among the first rotating shaft 131, the second rotating shaft 132, and the sliding member 135), so that the stress that the first rotating shaft 131 and the second rotating shaft 132 have to bear is considerably reduced. In other words, the first rotating shaft 131 and the second rotating shaft 132 do not have to bear the concentrated stress as described above, so that the appearance thereof may be effectively reduced corresponding to design needs, and that the hinge module 130 and the foldable electronic device 100 may feature a light and thin appearance.

Note that the first torque member 134 and the second torque member 133 of this embodiment are formed by a plurality of torque pieces stacked together and are not symmetrically disposed, which is not limited to the invention, and a number of the torque pieces may be increased, decreased, and disposed according to torsional needs, as such, in the following embodiments, the first torque member and the second torque member may be symmetrically disposed, and the same number of torque pieces may be disposed at two opposite sides of the sliding member, so that torque of the hinge module is evenly divided into the first rotating shaft and the second rotating shaft. Further, it may also be known that in an embodiment that is not shown, a torque member can be disposed at only one side of the sliding member, for example, the second torque member 133 as shown in FIG. 2A and FIG. 2B can be omitted and only the first torque member 134 is provided, and in this way, the synchronous rotation mechanism formed among the first rotating shaft 131, the second rotating shaft 132, and the sliding member 135 still operate normally.

Figure 3A:
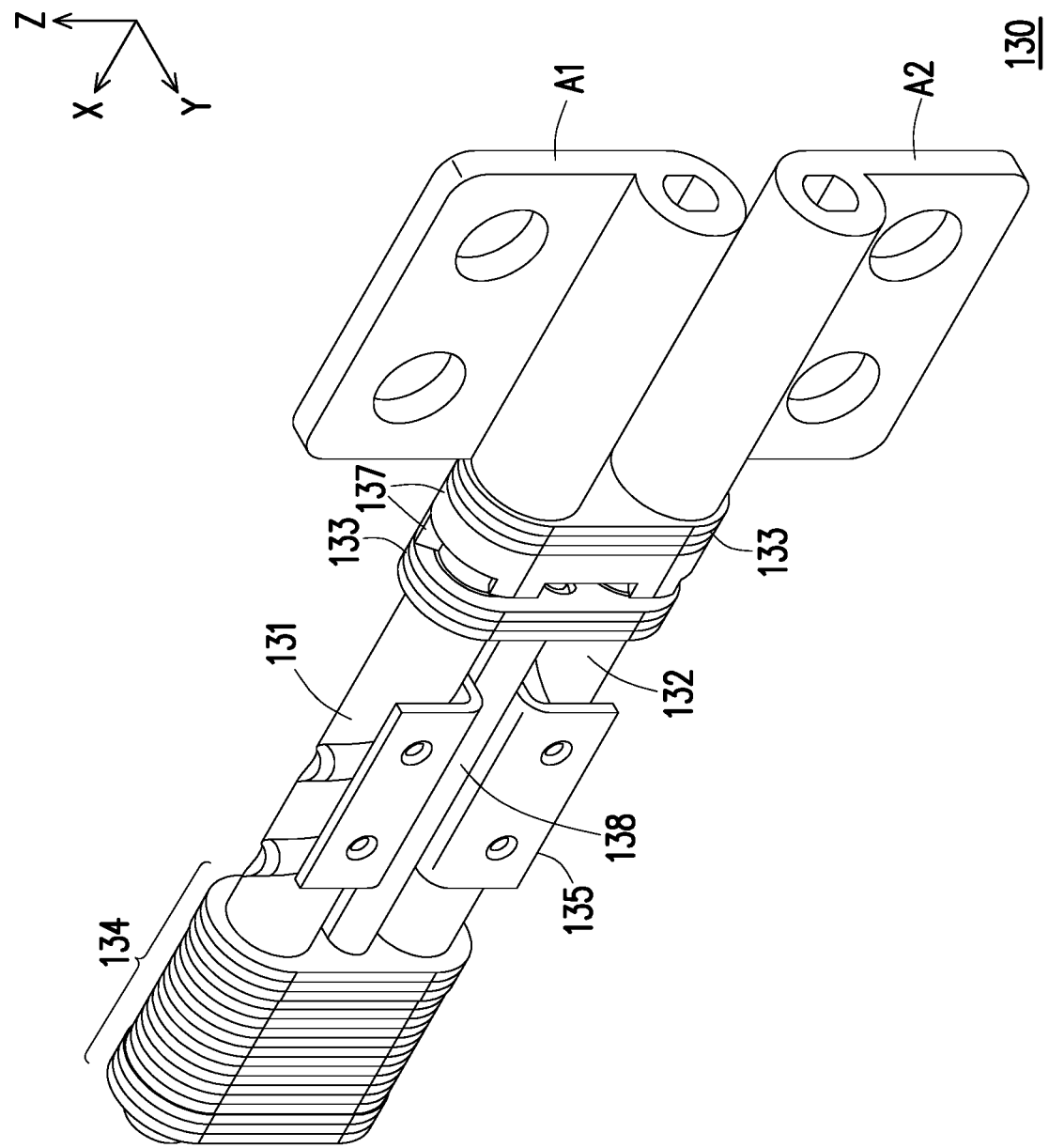
FIG. 3A is a schematic view of the hinge module of FIG. 2A in another state.
Figure 3B:
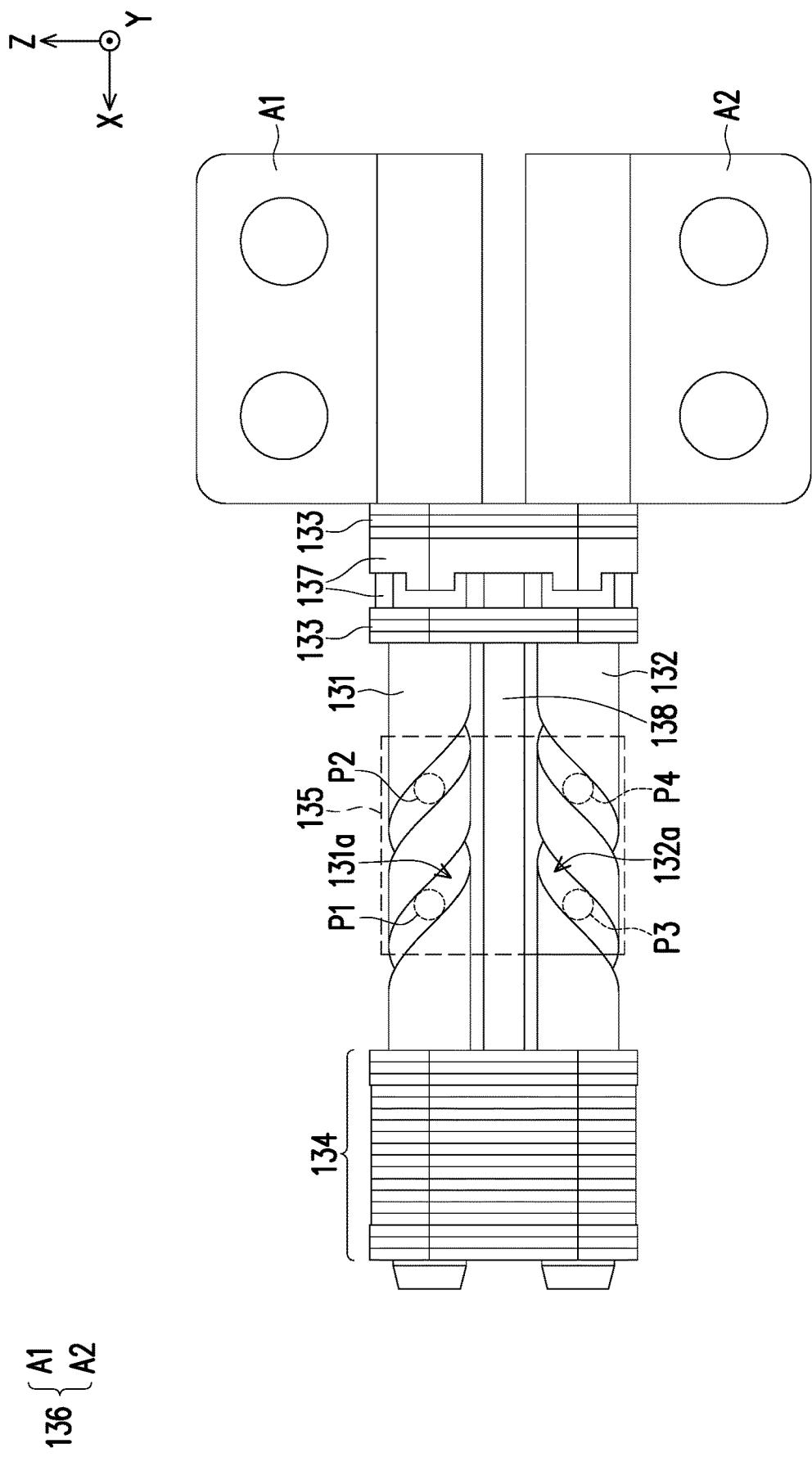
FIG. 3B is a front view of the hinge module of FIG. 3A.

FIG. 3A is a schematic view of the hinge module of FIG. 2A in another state. FIG. 3B is a front view of the hinge module of FIG. 3A. With reference to FIG. 3A and FIG. 3B together in comparison with FIG. 2A and FIG. 2C, in the process from FIG. 2A to FIG. 3A or in the process from FIG. 2C to FIG. 3B, the linking relation among the first rotating shaft 131, the second rotating shaft 132, and the sliding member 135 and synchronous rotation of the bodies caused by such linking relation are clearly presented. In order to allow the hinge module 130 to smoothly enable the bodies to be rotated and unfolded/folded, the hinge module 130 of this embodiment further includes a limiting structure 137 including a limiting portion M1 disposed on the first rotating shaft 131, a limiting portion M2 disposed on the second rotating shaft 132, a limiting member 137a, and limiting portions M3 and M4 disposed on the limiting member 137a. In the assembled hinge module 130, the first rotating shaft 131 and the second rotating shaft 132 penetrate the limiting member 137a, the limiting portions M1 and M3 are located on moving paths of each other, and the limiting portions M2 and M4 are located on moving paths of each other.

Figure 4A:
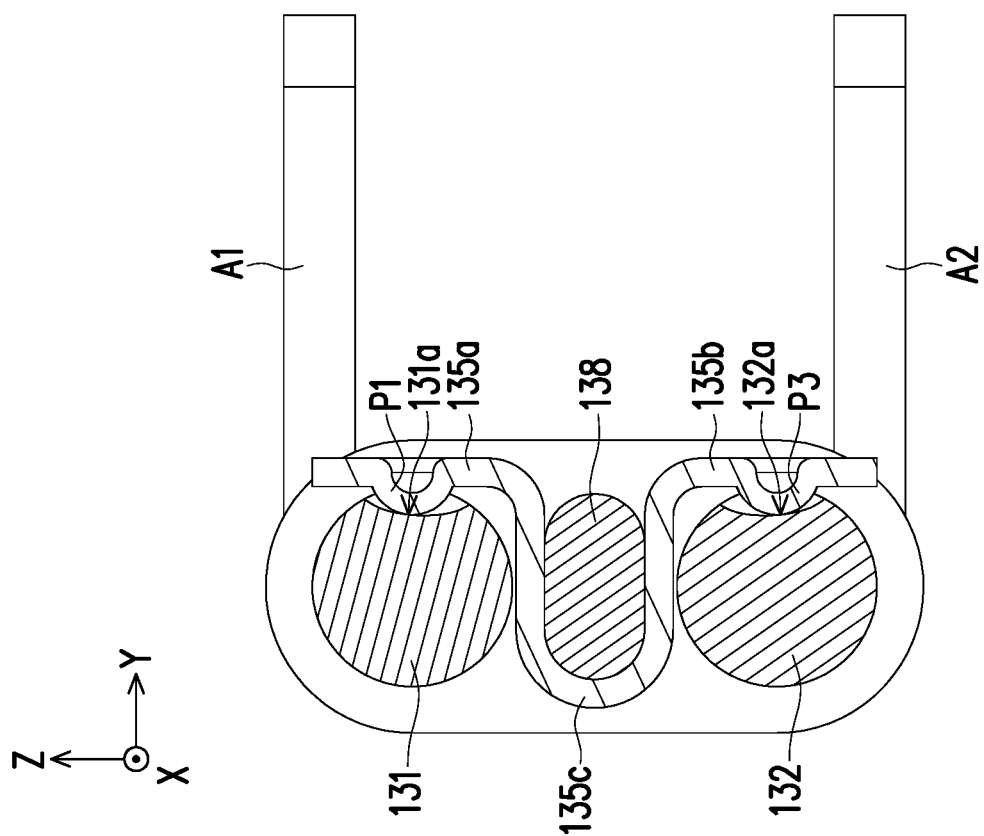
FIG. 4A is a cross-sectional view of the hinge module of FIG. 2C along a cross-sectional line A-A.
Figure 4B:
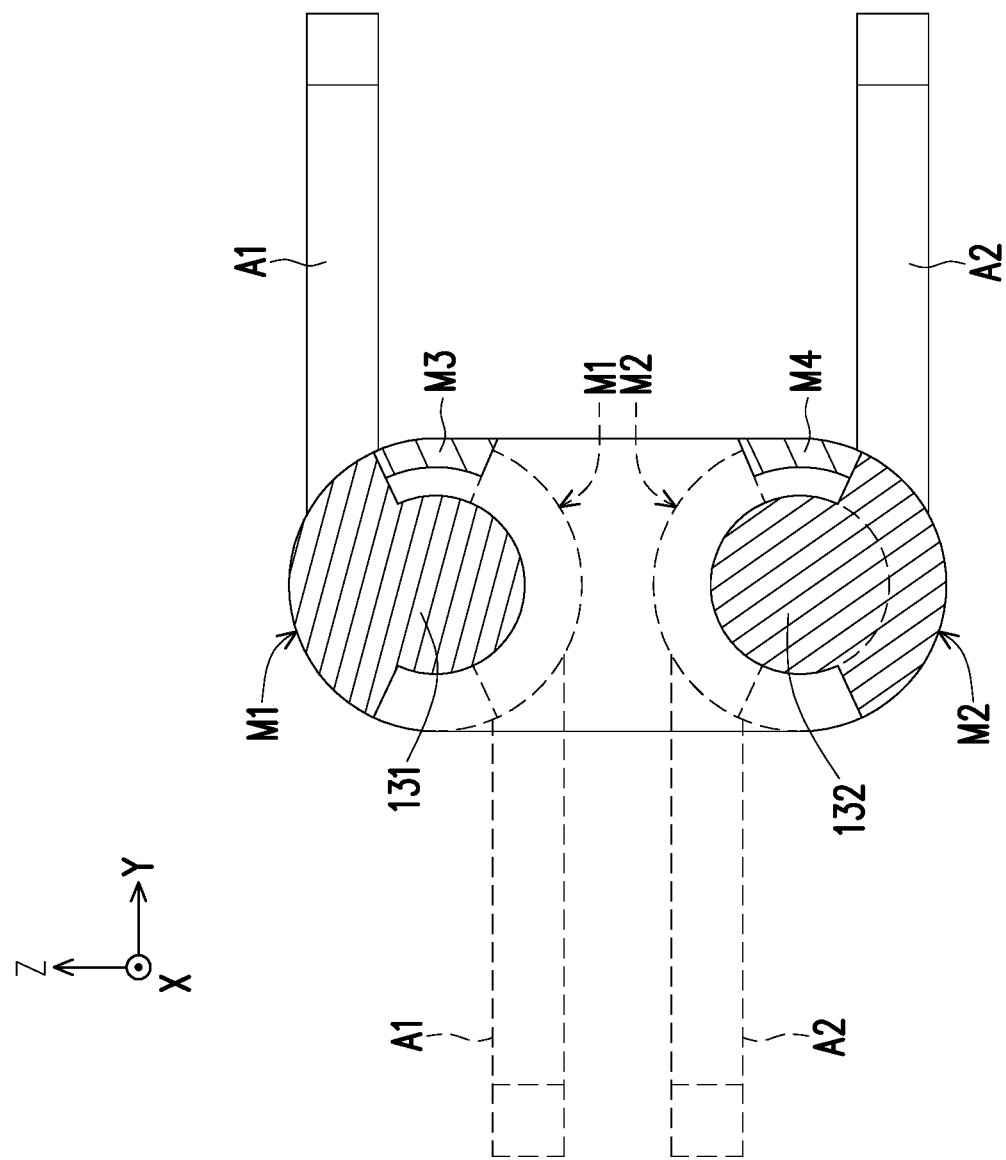
FIG. 4B is a cross-sectional view of the hinge module of FIG. 2C along a cross-sectional line B-B.

FIG. 4A is a cross-sectional view of the hinge module of FIG. 2C along a cross-sectional line A-A. FIG. 4B is a cross-sectional view of the hinge module of FIG. 2C along a cross-sectional line B-B. With reference to FIG. 2A and FIG. 4B together first, in this embodiment, as shown in FIG. 4B, when the first body 110 is stacked on the second body 120, a folded state (a 0-degree state) presented in FIG. 1 is shown, which is equivalent to the solid line contour shown in FIG. 4B. When the user applies a force to the first body 110 and drives the hinge module 130 to rotate, since the limiting portion M3 does not block the limiting portion M1 and the limiting portion M4 does not block the limiting portion M2, the force applied by the user may smoothly enable the first body 110 and the second body 120 to be synchronously rotated, and as shown in FIG. 3A and FIG. 3B, each of the first body 110 and the second body 120 is rotated by 90 degrees (the foldable electronic device 100 is presented in a 180-degree state), but since the limiting portions M1 and M2 are not blocked at this time, the user may continue to apply the force until the state shown by the dotted line contour shown in FIG. 4B is achieved, and such state means that the foldable electronic device 100 is in a reversed state (a 360-degree state) and also means that each of the first body 110 and the second body 120 is rotated and unfolded by 180 degrees. At this time, since the limiting portion M1 is blocked by the limiting portion M3 and the limiting portion M2 is blocked by the limiting portion M4, rotation of the first rotating shaft 131 and the second rotating shaft 132 is stop. As shown in FIG. 4B, the member A1 is rotated in a counter-clockwise direction, and the member A2 is rotated in a clockwise direction.

With reference to FIG. 2C and FIG. 4A, in order to allow the hinge module 130 to smoothly complete synchronous rotation, in this embodiment, the sliding member 135 is substantially formed by curling a plate body and is elastic, and the sliding member 135 has an abutting portion 135c and a pair of lateral wings 135a and 135b extending from the abutting portion 135c, the protrusions P1 and P2 are distributed over the lateral wing 135a, and the protrusions P3 and P4 are distributed over the lateral wing 135b, that is, the lateral wings 135a and 135b abut against the first rotating shaft 131 and the second rotating shaft 132 through the protrusions P1 to P4 and the spiral grooves 131a to 132a corresponding relatively. Further, the hinge module 130 further includes a rod member 138 connected between the first torque member 134 and the second torque member 133, an extending axial direction (the X-axis) of the rod member 138 is identical to an extending axial direction (the X-axis) of the first rotating shaft 131 and an extending direction (the X-axis) of the second rotating shaft 132, and the sliding member 135 is slidably coupled to the rod member 138 and is guided by the rod member 138.

More importantly, abutting directions (facing the negative Y-axis direction) of the lateral wings 135a and 135b and protrusions P1 to P4 located thereon abutting against the first rotating shaft 131 and the second rotating shaft 132 are opposite to an abutting direction (facing the positive Y-axis direction) of the abutting portion 135c abutting against the rod member 138. Since the abutting directions above are opposite to each other, the sliding member 135 may be stably maintained to be located between the first rotating shaft 131 and the second rotating shaft 132, and at the same time, the protrusions P1 to P4 may smoothly abut against the spiral grooves 131a and 131b without falling off. That is to say, since the sliding member 135 is elastic, interference is thus generated among the sliding member 135, the first rotating shaft 131, and the second rotating shaft 132 during assembly, and deformation of the sliding member 135 caused by the interference may ensure that a gap is not provided among the members.

Figure 5A:
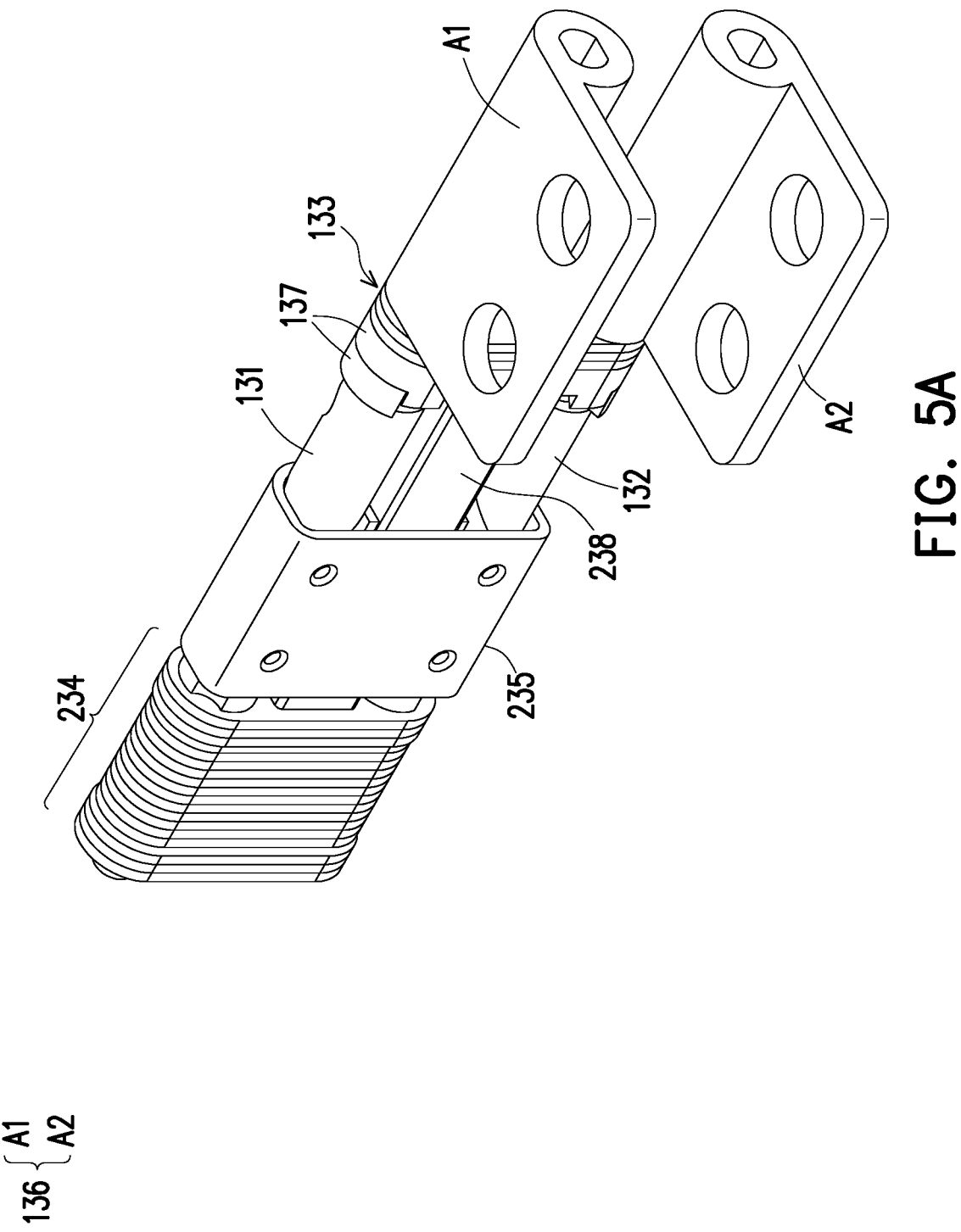
FIG. 5A is a schematic view of a hinge module according to another embodiment of the invention.
Figure 5B:
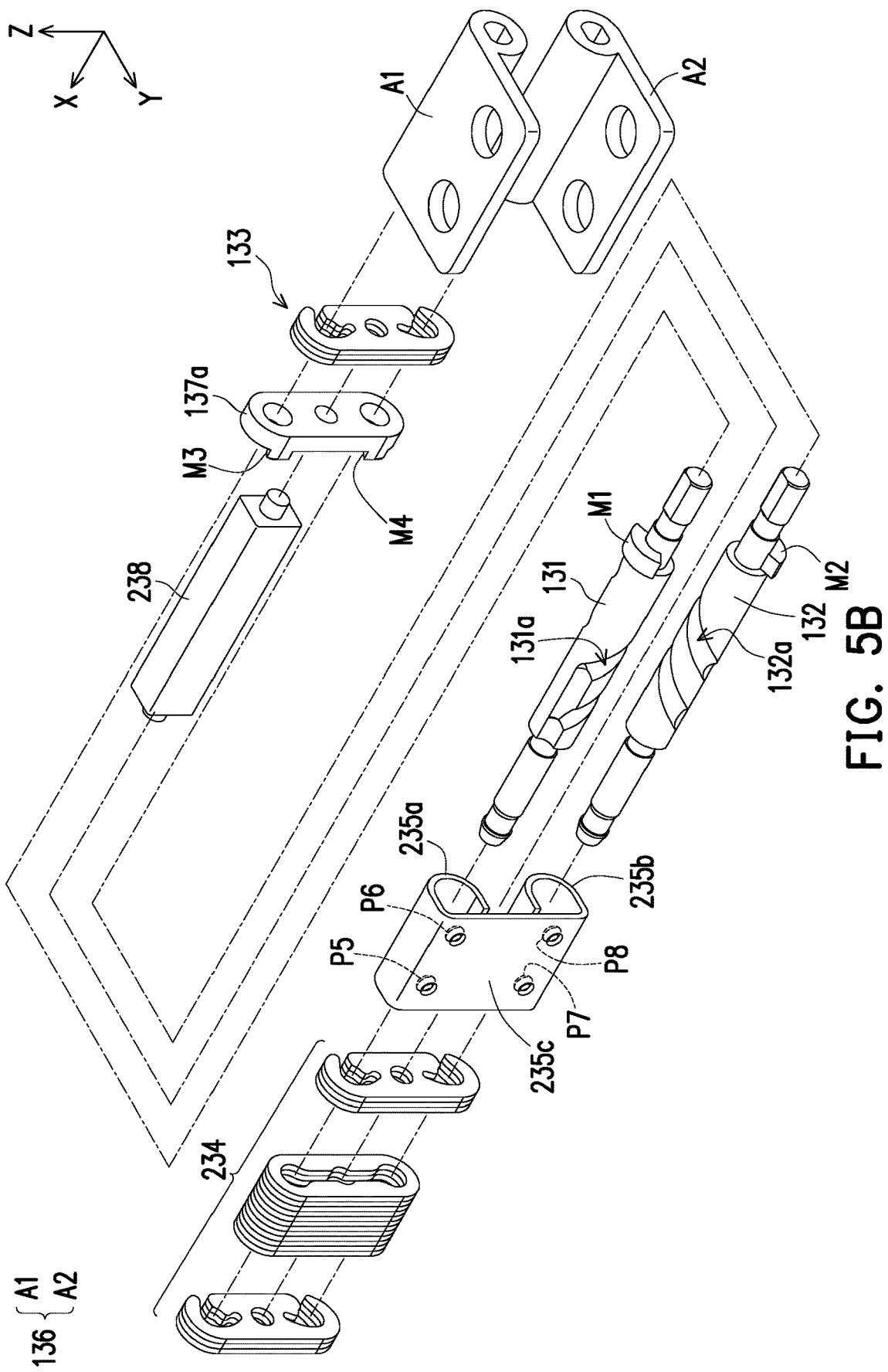
FIG. 5B is an exploded view of the hinge module of FIG. 5A.

FIG. 5A is a schematic view of a hinge module according to another embodiment of the invention. FIG. 5B is an exploded view of the hinge module of FIG. 5A. With reference to FIG. 5A and FIG. 5B together, similar to the embodiment above, a hinge module 230, includes the same first rotating shaft 131, the second rotating shaft 132, and spiral grooves 131a and 132a disposed thereon, a first torque member 234 and a second torque member 133 are also disposed at the sliding member and the two opposite sides of the driving mechanism formed by the first rotating shaft 131 and the second rotating shaft 132 to achieve the same stress dispersion effect, and the limiting structure 137 also provides the same stopping function required during rotation as described in the foregoing embodiments, so that an unfolding angle of each of the first rotating shaft 131 and the second rotating shaft 132 is maintained at 180 degrees via the hinge module 230. A sliding member 235 enables the first rotating shaft 131 and the second rotating shaft 132 to achieve synchronous rotation via a plurality of protrusions P5 to P8 and the spiral grooves 131a and 132a as well.

Nevertheless, differences between the foregoing embodiments and this embodiment include that the sliding member 235 has an abutting portion 235c and a pair of lateral wings extending from the abutting portion 235c, and the lateral wings of this embodiment are substantially a pair of curled bodies 235a and 235b formed by curling a plate body, the protrusions P5 to P8 are distributed over the abutting portions 235c, the abutting portion 235c slidably abuts against a rod member 238, and the curled bodies 235a and 235b movably cover the first rotating shaft 131 and the second rotating shaft 132 respectively, so that the sliding member 235 may steadily slide back and forth on the first rotating shaft 131 and the second rotating shaft 132 accordingly.

Figure 5C:
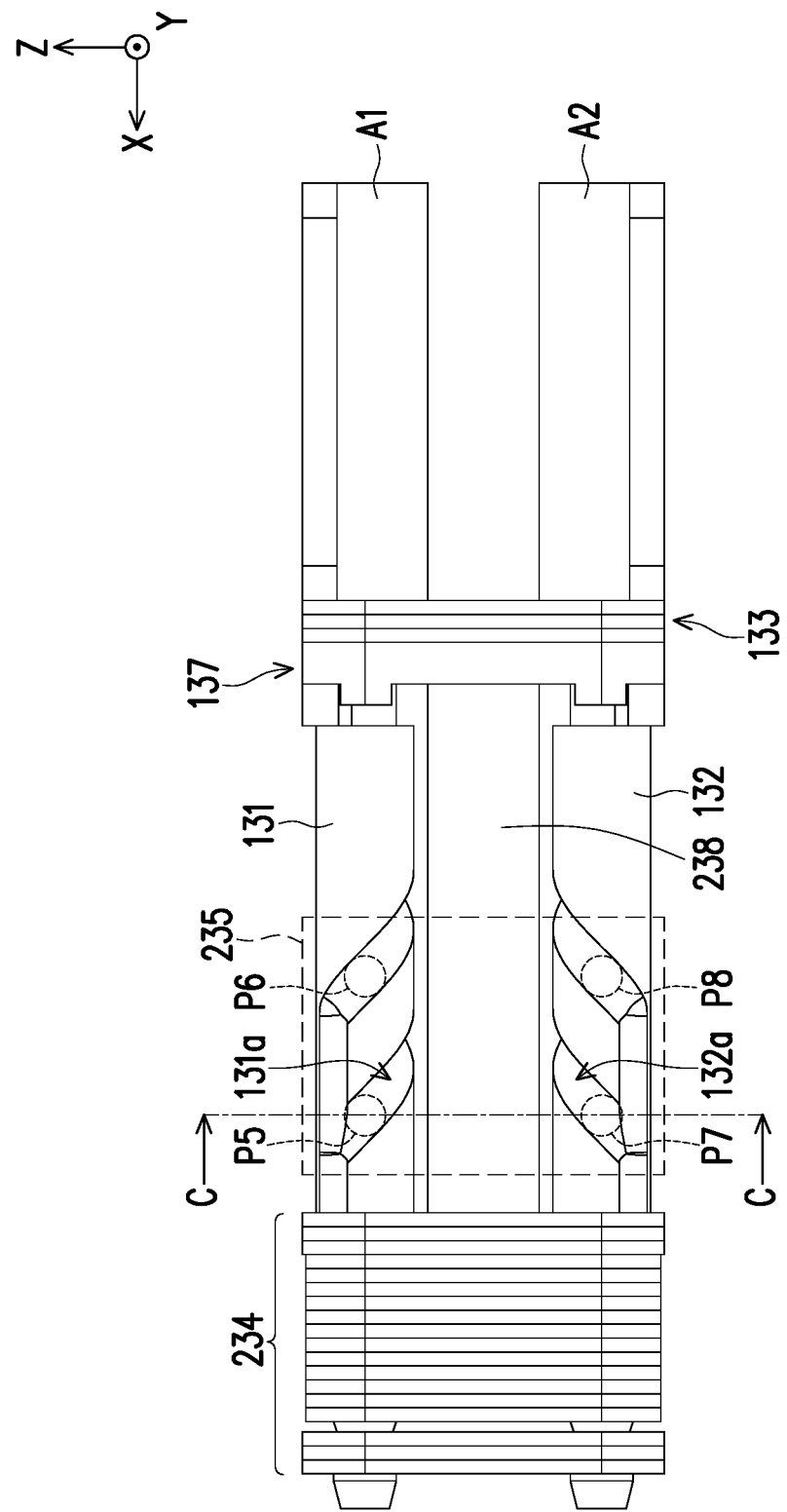
FIG. 5C is a front view of the hinge module of FIG. 5A.
Figure 5D:
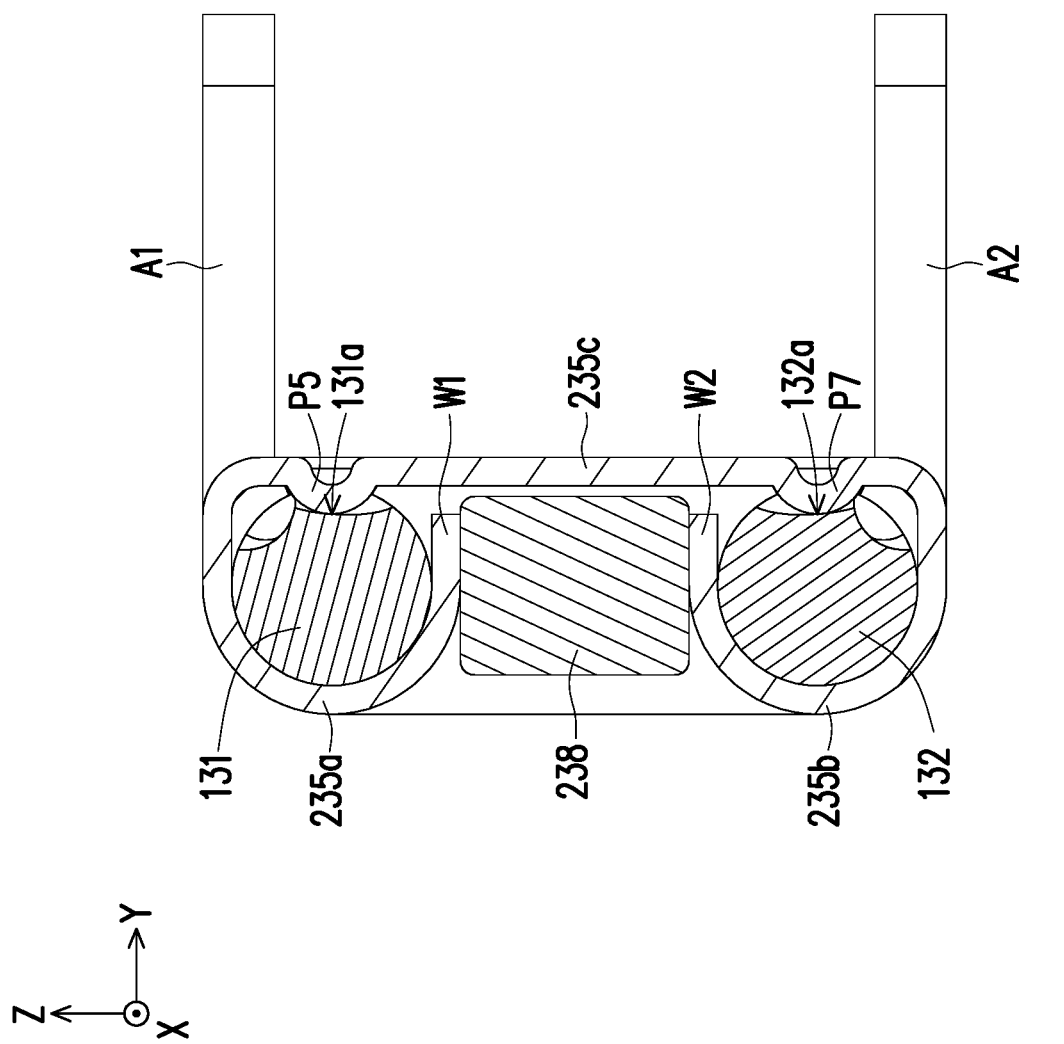
FIG. 5D is a cross-sectional view of the hinge module of FIG. 5C along a cross-sectional line C-C.

Further, FIG. 5C is a front view of the hinge module of FIG. 5A. FIG. 5D is a cross-sectional view of the hinge module of FIG. 5C along a cross-sectional line C-C. With reference to FIG. 5C and FIG. 5D together, substantially, the curled bodies 235a and 235b movably cover portions of the first rotating shaft 131 and the second rotating shaft 132 respectively, an end of the curled body 235a is abutted between the first rotating shaft 131 and the rod member 238, an end of the curled body 235b is abutted between the second rotating shaft 132 and the rod member 238, and an abutting degree of the protrusions P5 to P8 and the spiral grooves 131a and 131b changes with an abutting degree of each of the ends and the rod member 238. In other words, structural contact (abutting degree) among the sliding member 235, the first rotating shaft 131, and the second rotating shaft 132 is enhanced through the foregoing member configuration in this embodiment. Similar to the foregoing embodiments, the sliding member 235 is elastic and thus may be deformed during assembly so that no gap is provided among members after assembly is completed, and such effect can be further achieved owing to enhancement of structural contact (abutting degree) among the members in this embodiment.

Figure 6A:
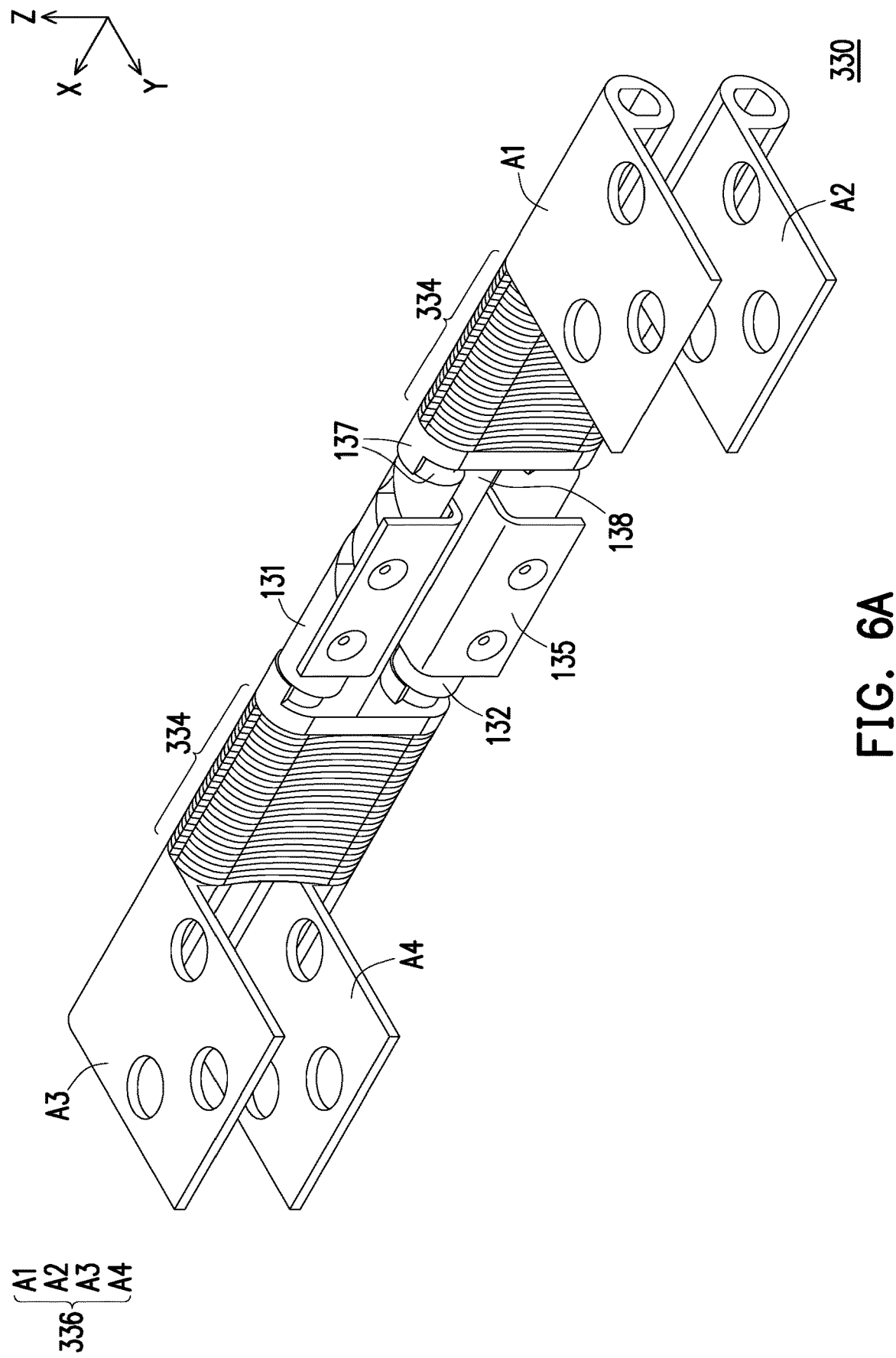
FIG. 6A is a schematic view illustrating a hinge module according to another embodiment of the invention.

FIG. 6A is a schematic view illustrating a hinge module according to another embodiment of the invention. With reference to FIG. 6A in comparison to FIG. 2A and FIG. 2B, differences between this embodiment and the foregoing embodiments include that a pair of torque members 334 depicted in FIG. 6A are symmetrically disposed at two opposite sides of the first rotating shaft 131, the second rotating shaft 132 and the sliding member 135 along the X-axis, a bracket 336 also includes members A1, A2, A3, and A4 disposed at two opposite sides, the members A1 and A3 are assembled to the first body 110 (shown in FIG. 1), and the members A2 and A4 are assembled to the second body 120 (shown in FIG. 1). Such structure is similar to that after being sandwiched by the pair of torque members 334, the first rotating shaft 131, the second rotating shaft 132, and the sliding member 135 are further sandwiched outside by the bracket 336, so as to form a hinge module 330 with compact-configured and tightly-disposed.

Figure 6B:
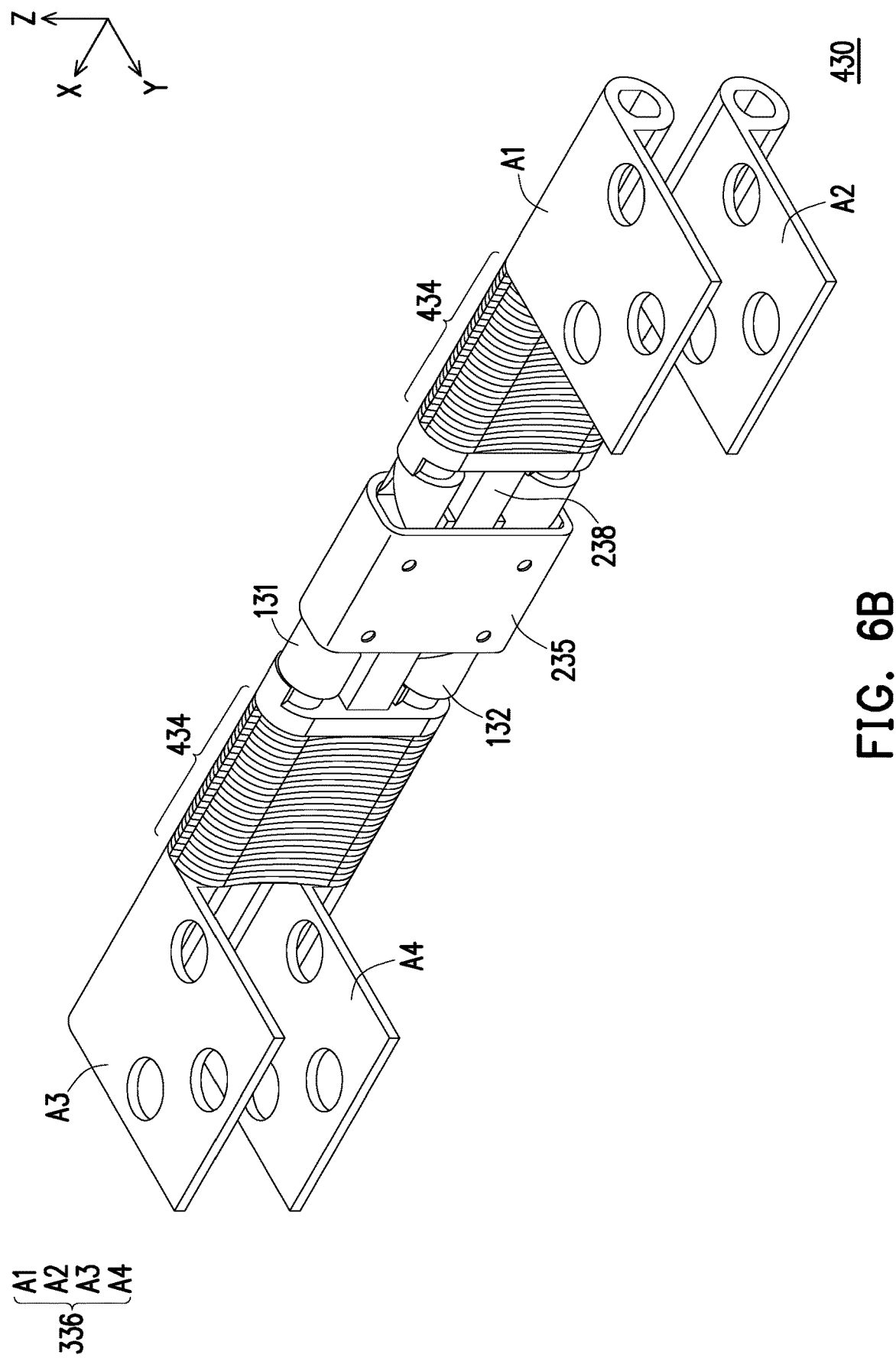
FIG. 6B is a schematic view illustrating a hinge module according to another embodiment of the invention.

FIG. 6B is a schematic view illustrating a hinge module according to another embodiment of the invention. With reference to FIG. 6B in comparison with FIG. 5A and FIG. 5B, similarly, a hinge module 430 of this embodiment is similar the hinge module 330 shown in FIG. 5A and FIG. 5B but having symmetrical torque members 434 disposed at two opposite sides of the first rotating shaft 131, the second rotating shaft 132, and the sliding member 235 instead, and differences between this hinge module and the hinge module 230 are identical to the differences between the hinge module 330 and the hinge module 130 as described above.

In view of the foregoing, in the embodiments of the invention, the sliding member of the hinge module is coupled to the first rotating shaft and the second rotating shaft simultaneously, so that the first rotating shaft and the second rotating shaft generate synchronous rotation, and thereby, efficiency of rotating and unfolding/folding of the foldable electronic device is increased. Further, each of the dual rotating shafts has the spiral groove, and the sliding member is coupled to the spiral grooves via the protrusions, so as to be linked up with the dual rotating shafts accordingly. Further, the sliding member is elastic, so that structural limitation is formed between the sliding member and the rod member between the dual rotating shafts. At the same time, when the dual rotating shafts are assembled, deformation is formed owing to interference matching, and such deformation is configured to absorb assembly tolerance, that is, deformation of the sliding member may allow the protrusions thereof to be kept to be coupled to the spiral grooves without falling off.

In addition, the first torque member and the second torque member of the hinge module are disposed at the two opposite sides of the driving mechanism formed among the sliding member, the first rotating shaft, and the second rotating shaft, and thus, when the hinge module is rotated, the first torque member and the second torque member individually provide torque to the rotating shafts, and that is to say, the single rotating shaft does not have to bear excessively concentrated stress because of the stress dispersion the separation of the torque members. In this way, as the first rotating shaft and the second rotating shaft do not have to bear greater stress, the appearance thereof may thus be reduced by a designer, so that the hinge module and the foldable electronic device applying the same may feature the light and thin appearance.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hinge module, comprising:
    a first rotating shaft;
    a second rotating shaft;
    a sliding member, slidably coupled to the first rotating shaft and the second rotating shaft simultaneously, wherein when the first rotating shaft is rotated, the first rotating shaft synchronously rotates the second rotating shaft via the sliding member, or when the second rotating shaft is rotated, the second rotating shaft synchronously rotates the first rotating shaft via the sliding member;
    a first torque member and a second torque member, respectively connected to the first rotating shaft and the second rotating shaft, the first torque member and the second torque member located at two opposite sides of a sliding range of the sliding member along the first rotating shaft and the second rotating shaft; and
    a rod member, connected between the first torque member and the second torque member, an extending axial direction of the rod member being identical to an extending axial direction of the first rotating shaft and an extending axial direction of the second rotating shaft, the sliding member slidably coupled to the rod member and guided by the rod member,
    wherein the sliding member has a plurality of protrusions, an abutting portion, and a pair of lateral wings extending from the abutting portion, the abutting portion slidably abuts against the rod member, each of the first rotating shaft and the second rotating shaft has a spiral groove, and the protrusions are correspondingly coupled to the pair of spiral grooves.

2. The hinge module as claimed in claim 1, wherein a sliding axial direction of the sliding member is identical to a rotating axial direction of the first rotating shaft and a rotating axial direction of the second rotating shaft.

3. The hinge module as claimed in claim 1, wherein each of the first rotating shaft and the second rotating shaft has a spiral groove, and the sliding member has a plurality of protrusions correspondingly coupled to the pair of spiral grooves.

4. The hinge module as claimed in claim 1, wherein the sliding member is formed by curling a plate body and is elastic.

5. The hinge module as claimed in claim 1, wherein the protrusions are distributed over the pair of lateral wings, and abutting directions of the protrusions abutting against the first rotating shaft and the second rotating shaft are opposite to an abutting direction of the abutting portion abutting against the rod member.

6. The hinge module as claimed in claim 1, wherein the protrusions are distributed over the abutting portion, and abutting directions of the protrusions abutting against the first rotating shaft and the second rotating shaft are identical to an abutting direction of the abutting portion abutting against the rod member.

7. A foldable electronic device, comprising:
a first body;
a second body;
at least one hinge module, connecting the first body and the second body, the first body and the second body being rotated to be unfolded or folded with respect to each other via the hinge module, the at least one hinge module comprising:
a first rotating shaft;
a second rotating shaft;
a sliding member, slidably coupled to the first rotating shaft and the second rotating shaft simultaneously, wherein when the first rotating shaft is rotated, the first rotating shaft synchronously rotates the second rotating shaft via the sliding member, or when the second rotating shaft is rotated, the second rotating shaft synchronously rotates the first rotating shaft via the sliding member;
a first torque member and a second torque member, respectively connected to the first rotating shaft and the second rotating shaft, the first torque member and the second torque member located at two opposite sides of a sliding range of the sliding member along the first rotating shaft and the second rotating shaft; and
a rod member, connected between the first torque member and the second torque member, an extending axial direction of the rod member being identical to an extending axial direction of the first rotating shaft and an extending axial direction of the second rotating shaft, the sliding member slidably coupled to the rod member and guided by the rod member,
wherein the sliding member has a plurality of protrusions, an abutting portion, and a pair of lateral wings extending from the abutting portion, the abutting portion slidably abuts against the rod member, each of the first rotating shaft and the second rotating shaft has a spiral groove, the protrusions are distributed over the pair of lateral wings and are correspondingly coupled to the pair of spiral grooves.

8. The foldable electronic device as claimed in claim 7, wherein a sliding axial direction of the sliding member is identical to a rotating axial direction of the first rotating shaft and a rotating axial direction of the second rotating shaft.

9. The foldable electronic device as claimed in claim 7, comprising a plurality of hinge modules, disposed at a same side of the first body and the second body and independent from each other.

10. The foldable electronic device as claimed in claim 7, wherein each of the first rotating shaft and the second rotating shaft has a spiral groove, and the sliding member has a plurality of protrusions correspondingly coupled to the pair of spiral grooves.

11. The foldable electronic device as claimed in claim 7, wherein the sliding member is formed by curling a plate body and is elastic.

12. The foldable electronic device as claimed in claim 7, wherein the protrusions are distributed over the pair of lateral wings, and abutting directions of the protrusions abutting against the first rotating shaft and the second rotating shaft are opposite to an abutting direction of the abutting portion abutting against the rod member.

13. The foldable electronic device as claimed in claim 7, wherein the protrusions are distributed over the abutting portion, and abutting directions of the protrusions abutting against the first rotating shaft and the second rotating shaft are identical to an abutting direction of the abutting portion abutting against the rod member.

14. A foldable electronic device, comprising:
a first body;
a second body;
at least one hinge module, connecting the first body and the second body, the first body and the second body being rotated to be unfolded or folded with respect to each other via the hinge module, the at least one hinge module comprising:
a first shaft;
a second rotating shaft;
a sliding member, slidably coupled to the first rotating shaft and the second rotating shaft simultaneously, a sliding axial direction of the sliding member is identical to a rotating axial direction of the first rotating shaft and a rotating axial direction of the second rotating shaft, wherein when the first rotating shaft is rotated, the first rotating shaft synchronously rotates the second rotating shaft via the sliding member, or when the second rotating shaft is rotated, the second rotating shaft synchronously rotates the first rotating shaft via the sliding member;
at least one torque member, connected to the first rotating shaft and the second rotating shaft, the at least one torque member disposed adjacent to one side of the sliding member; and
a rod member, located between the first rotating shaft and the second rotating shaft, an extending axial direction of the rod member being identical to an extending axial direction of the first rotating shaft and an extending axial direction of the second rotating shaft, the sliding member slidably coupled to the rod member and guided by the rod member,
wherein the sliding member has a plurality of protrusions, an abutting portion, and a pair of lateral wings extending from the abutting portion, the abutting portion slidably abuts against the rod member, each of the first rotating shaft and the second rotating shaft has a spiral groove, the protrusions are correspondingly coupled to the pair of spiral grooves, the protrusions are distributed over the pair of lateral wings, and abutting directions of the protrusions abutting against the first rotating shaft and the second rotating shaft are opposite to an abutting direction of the abutting portion abutting against the rod member.

15. The foldable electronic device as claimed in claim 14, wherein each of the first rotating shaft and the second rotating shaft has a spiral groove, and the sliding member has a plurality of protrusions correspondingly coupled to the pair of spiral grooves.

16. The foldable electronic device as claimed in claim 14, wherein the sliding member is formed by curling a plate body and is elastic.

* * * * *